R. G. THOMPSON.
LOCOMOTIVE CONSTRUCTION.
APPLICATION FILED FEB. 3, 1917.
1,344,740.
Patented June 29, 1920.
3 SHEETS—SHEET 1.
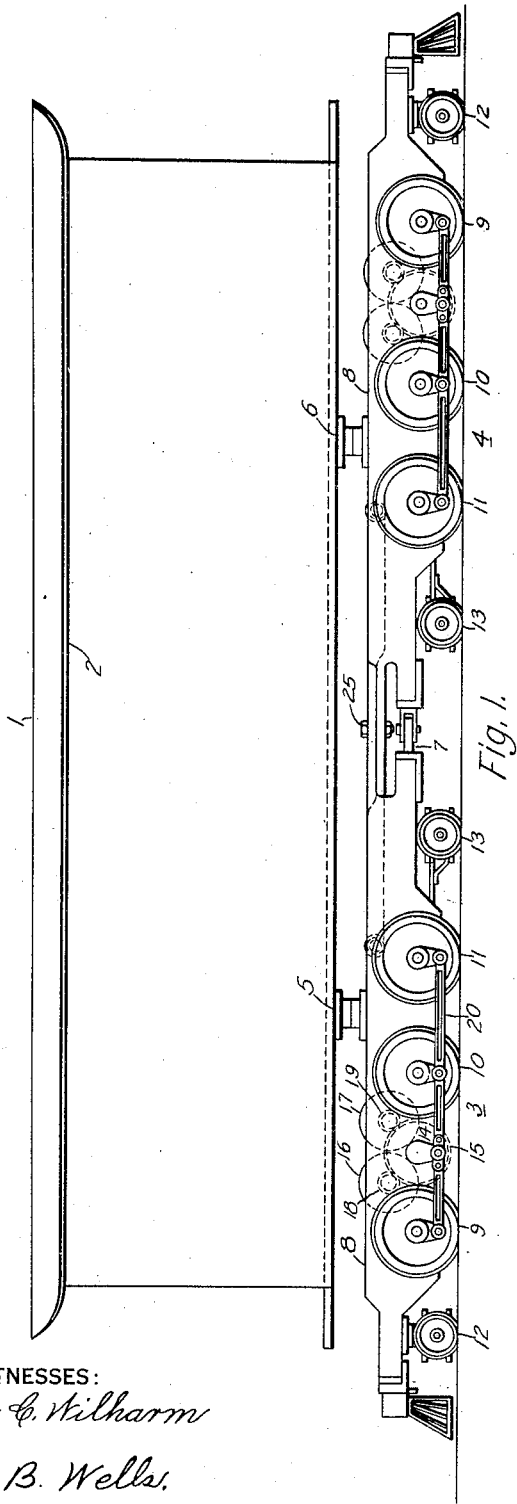
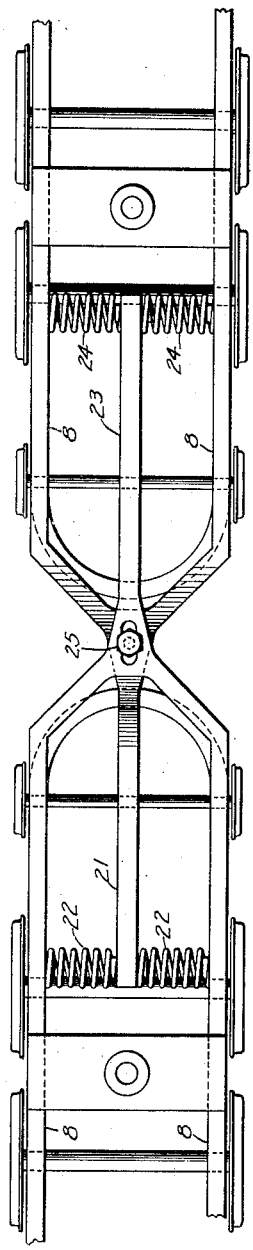
WITNESSES:
Fred. C. Wilharm
W. B. Wells.
INVENTOR
Russell G. Thompson
BY
ATTORNEY R. G. THOMPSON.
LOCOMOTIVE CONSTRUCTION.
APPLICATION FILED FEB. 3, 1917.
1,344,740.
Patented June 29, 1920.
3 SHEETS—SHEET 2.
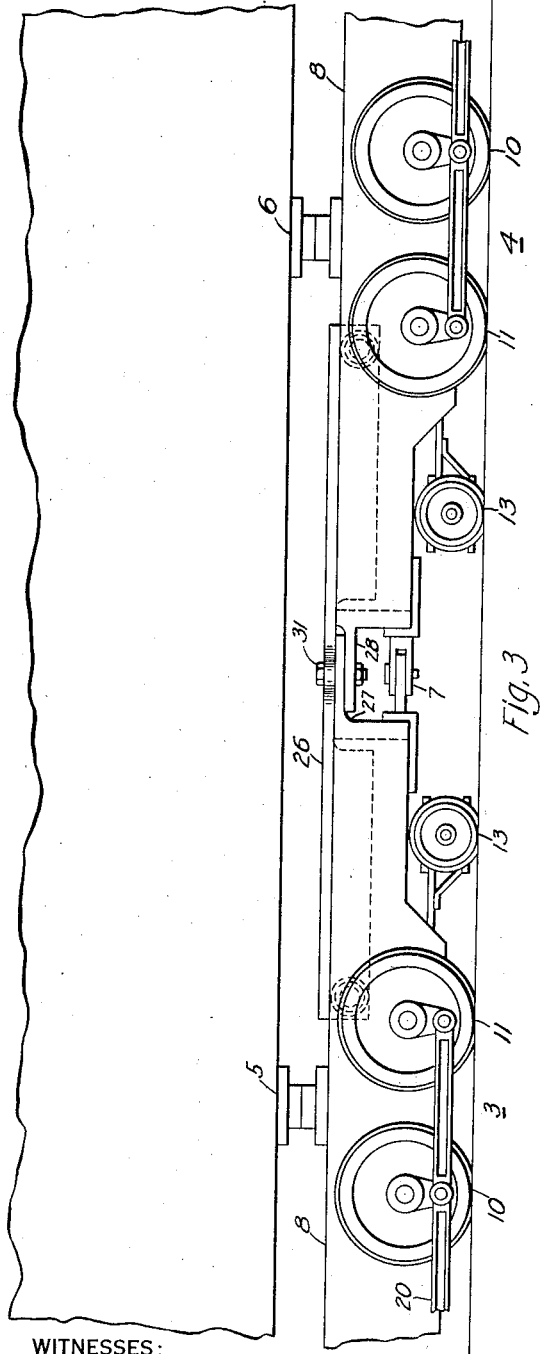
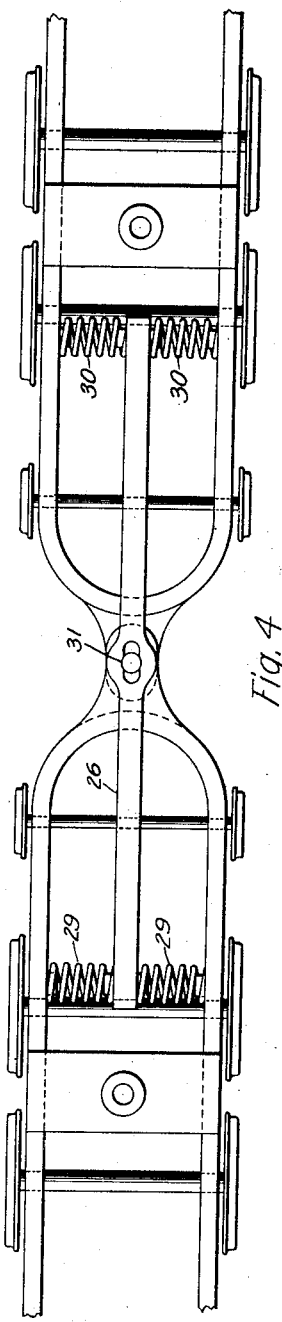
WITNESSES:
Fred. C. Wilharm
W. B. Wells.
INVENTOR
Russell G. Thompson
BY
Wesley G. Carr
ATTORNEY R. G. THOMPSON.
LOCOMOTIVE CONSTRUCTION.
APPLICATION FILED FEB. 3, 1917.
1,344,740.
Patented June 29, 1920.
3 SHEETS—SHEET 3.
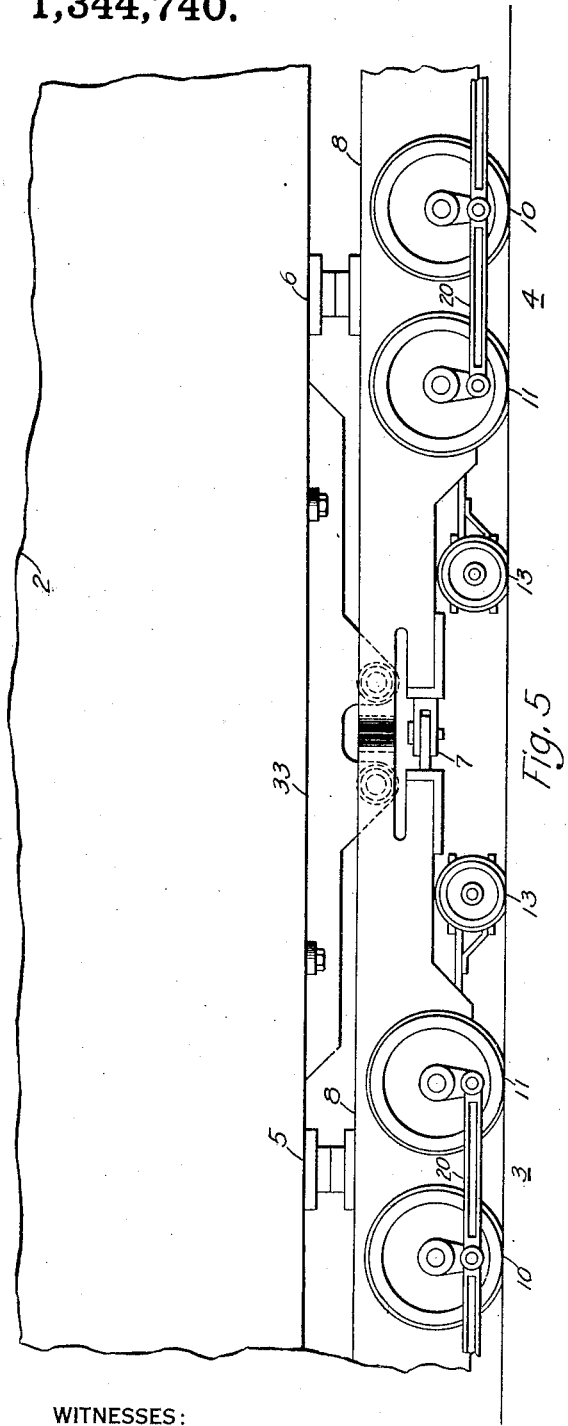
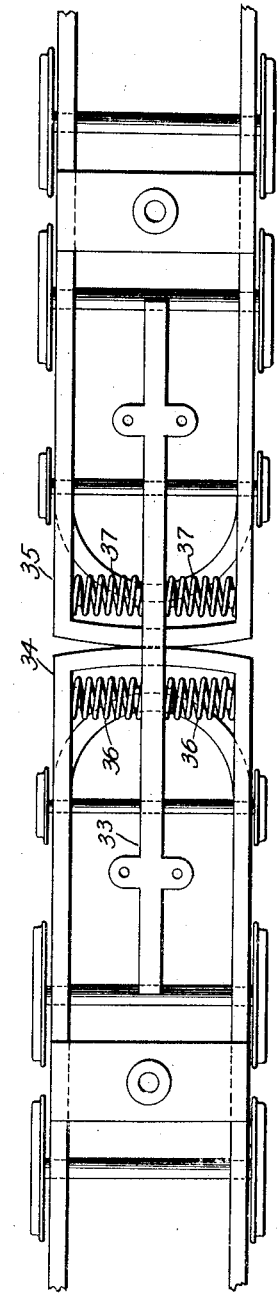
WITNESSES:
Fred C. Wilharm
W. B. Wells
INVENTOR
Russell G. Thompson
BY
Wesley G. Carr
ATTORNEY

UNITED STATES PATENT OFFICE.

RUSSELL G. THOMPSON, OF WILKINSBURG, PENNSYLVANIA, ASSIGNOR TO WESTINGHOUSE ELECTRIC & MANUFACTURING COMPANY, A CORPORATION OF PENNSYLVANIA.

LOCOMOTIVE CONSTRUCTION.

1,344,740.   Specification of Letters Patent.   Patented June 29, 1920.

Application filed February 3, 1917. Serial No. 146,422.

*To all whom it may concern:*

Be it known that I, RUSSELL G. THOMPSON, a citizen of the United States, and a resident of Wilkinsburg, in the county of Allegheny and State of Pennsylvania, have invented a new and useful Improvement in Locomotive Constructions, of which the following is a specification.

My invention relates to railway vehicles and particularly to means for adjusting the various trucks relative to each other and to the cabs or body portions associated therewith.

One object of my invention is to provide a railway vehicle having a cab and a plurality of trucks associated therewith with means which shall resiliently exert a force tending to maintain the trucks in alinement with the cab and to prevent nosing of the various trucks.

Another object of my invention is to provide a resilient connection between the various trucks of a locomotive which shall exert a force tending to equalize the flange pressure on the various driving wheels when the locomotive negotiates a curve.

More specifically, my invention embodies a plurality of spring members which are so disposed relative to the trucks of a railway vehicle as to maintain a constant force tending to hold the various trucks in alinement with the cab or body portion.

In electric locomotives and particularly in locomotives provided with driving trucks and three pairs of driving wheels associated therewith, there is an uneven flange pressure on the various driving wheels and, in many cases, an unnecessary nosing of the various trucks.

In a locomotive constructed in accordance with my invention, resilient members are provided for exerting a force tending to maintain the various trucks of the locomotive in alinement with the cab, whereby the flange pressure on the various driving wheels is equalized and an unnecessary nosing of the various trucks is prevented.

In the accompanying drawings, Figure 1 is an elevational view of a locomotive constructed in accordance with my invention; Fig. 2 is a plan view of a portion of the trucks of the locomotive illustrated in Fig. 1; Fig. 3 is an elevational view of a locomotive embodying a modification of my invention; Fig. 4 is a plan view of the trucks illustrated in Fig. 3; Fig. 5 is an elevational view of a portion of a locomotive embodying another modification of my invention; and Fig. 6 is a plan view of the trucks illustrated in Fig. 5.

Referring to Figs. 1 and 2 of the drawings, a locomotive 1 embodies a cab 2 and two articulated running gears 3 and 4 which are respectively connected to the cab 2 by means of pivotal connections 5 and 6 and are connected together by means of an articulated connection 7. Each of the running gears embodies side frames 8 which are mounted on pairs of driving wheels 9 and 10 and 11, a forward pivotal guiding truck 12, and a rear radial truck 13. A jack shaft 14, having gear wheels 15 mounted thereon, is disposed between the driving wheels 9 and 10, and propelling motors 16 and 17, having pinions 18 and 19 mounted on the armature shafts thereof, are disposed adjacent to the jack shaft 14 so that the pinions 18 and 19 mesh with the gear wheels 15. The jack shaft 14 is connected to the driving wheels 9 and 10 and 11 by means of side rods 20.

The side frames 8 of the running gear 4 are provided with an arm 21 which projects between the side frames of the running gear 3 and is connected thereto by means of the springs 22. The side frames 8 of the running gear 3 are provided with a similar arm 23 which projects between the side frames of the running gear 4 and is connected thereto by means of springs 24. The arms 21 and 23 are disposed above the articulated connection 7 between the two running gears and are restrained from vertical movement relative to each other by means of a bolt 25. However, sufficient clearance should be provided between the bolt 25 and the arms 21 and 23 so as not to interfere with the rotative movement of the trucks when the latter are operating on a curved track.

The springs 22 and 24 which are disposed between the side frames of the running gears 3 and 4 and the arms 21 and 23, exert a force which tends to maintain the two running gears 3 and 4 in alinement with the cab 2.

In the modifications illustrated in Figs. 3 to 6, inclusive, parts corresponding to those illustrated in Figs. 1 and 2 are designated by like reference characters. Referring to Figs. 3 and 4 of the drawings, the arms 23 and 21 of the running gears 3 and 4, illustrated in Figs. 1 and 2, are replaced by a beam 26 which is mounted on projections 27 and 28 on the side frames of the running gears 3 and 4. The beam 26 is disposed between the side frames of the two running gears and is respectively connected thereto by means of springs 29 and 30 which perform a function similar to that performed by the springs 22 and 24 that are illustrated in Figs. 1 and 2 of the drawings. The beam 26 is connected to the two projections 27 and 28 by a bolt 31, and sufficient clearance is provided therebetween so as not to interfere with the movement of the running gears when the locomotive is operating on a curve.

Referring to Figs. 5 and 6 of the drawings, a modification of my invention is illustrated in which the cab 2 is provided with a beam 33 which is disposed between the side frames 8 of the two running gears 3 and 4. The two running gears 3 and 4 are respectively provided with projections 34 and 35 and springs 36 and 37 which are disposed between the projections 34 and 35 and the beam 33 for maintaining the two running gears in alinement with the cab 2.

When a locomotive of the type now in service, which is provided with running gears having six driving wheels and a center pin located between two pairs of the driving wheels, negotiates a curve, the maximum force due to the cab inertia falls on the flange of the front wheel of the rear truck and on the flange of the rear wheel of the front truck. In a locomotive constructed in accordance with my invention and as above described, the resilient members disposed between the two trucks or between the trucks and the cab exert a force tending to maintain the trucks in alinement with the cab and, therefore, transfer a portion of the flange pressure from a rear wheel of the front truck and a front wheel of the rear truck to the remaining wheels of the two trucks.

Although I have illustrated my invention by means of an electric locomotive, it is to be understood that the same may be applied to various other types of vehicles and to other trucks besides the main driving trucks of an electric locomotive.

Variations in the structure and arrangement and location of parts may be made within the spirit and scope of my invention, and such modifications are intended to be covered by the appended claims.

I claim as my invention:

1. In a railway vehicle, the combination of two trucks, an articulated connection between said trucks, a vehicle body supported on said trucks and pivotally connected to each of them, and resilient means in advance of and behind said articulated connection and connected thereto tending to maintain said trucks longitudinally in alinement.

2. In a railway vehicle, the combination of two trucks comprising frames having an articulated connection between them, a body mounted on, and pivotally connected to, said trucks, arms extending forwardly and rearwardly from said articulated connection, and means between said arms and said truck frames tending to maintain said trucks in longitudinal alinement.

3. In a railway vehicle, the combination of two trucks comprising frames having an articulated connection between them, a body mounted on, and pivotally connected to, said trucks, arms extending forwardly and rearwardly from said articulated connection, and springs bearing against said frames and said arms and tending to maintain said trucks in longitudinal alinement.

4. In a locomotive, the combination of two trucks comprising frames having an articulated connection between them, a cab mounted on, and pivotally connected to, said frames, arms extending forwardly and rearwardly from said articulated connection, and springs between the ends of said arms and said truck frames tending to maintain said trucks in longitudinal alinement.

5. In an electric locomotive, the combination with a cab and a plurality of articulated trucks associated therewith, of a beam attached to the cab and disposed adjacent to said trucks, and resilient members for joining the trucks to said beam and for exerting a force tending to maintain the trucks in alinement with the cab.

6. In a locomotive, the combination with a cab and a plurality of articulated trucks pivotally connected thereto, of a beam attached to said cab, resilient members disposed laterally to said beam for connecting the beam to the trucks and for exerting a force tending to maintain the trucks in alinement with the cab.

7. In an electric locomotive, the combination with a cab and a plurality of articulated trucks associated therewith, each of said trucks being provided with side frames, of a beam attached to the cab and disposed between the side frames of said trucks and spring members disposed between the truck side frames and said beam to equalize the flange pressure on the various truck wheels and to exert a force tending to maintain the trucks in alinement with the cab.

In testimony whereof I have hereunto subscribed my name this 20th day of Jan., 1917.

RUSSELL G. THOMPSON.